Aug. 26, 1969 R. W. JONES ET AL 3,463,007
FIELD GRADIENT CORRELATOR SYSTEM FOR FIELD EFFECT TESTING
Filed Feb. 27, 1967 8 Sheets-Sheet 1

INVENTORS
ROGER W. JONES
LLOYD M. WHITE
BY
*Robert D Rogers*
ATTORNEY

INVENTORS
ROGER W. JONES
LLOYD M. WHITE

NORMAL

X COORDINATES

| Y | A | B | C | D | E | F | G | H | I | J | K | L | M | N | O |
|---|---|---|---|---|---|---|---|---|---|---|---|---|---|---|---|
| 1 | 0 | 0 | 0 | 0 | 0 | 0 | 0 | 0 | .1 | 0 | 0 | 0 | .1 | .3 | .1 |
| 2 | 0 | 0 | 0 | .1 | .1 | 0 | 0 | .1 | .2 | .1 | 0 | 0 | .2 | .5 | .2 |
| 3 | 0 | 0 | .1 | .3 | .2 | .1 | .1 | .2 | .3 | .2 | .1 | .1 | .4 | .6 | .3 |
| 4 | .1 | .2 | .3 | .3 | .2 | .1 | .2 | .4 | .5 | .3 | .2 | .2 | .6 | .9 | .4 |
| 5 | .1 | .3 | .5 | .9 | .5 | .3 | .4 | .7 | 1 | .9 | .4 | .4 | .7 | 1 | .5 |
| 6 | .1 | .4 | .7 | 1.8 | .8 | .4 | .6 | 2.1 | 3 | 1.6 | .6 | .6 | .8 | 1.3 | .6 |
| 7 | .1 | .5 | .9 | 2.3 | 1 | .4 | .7 | 3.1 | 3.2 | 1.7 | .6 | .6 | .8 | 1.3 | .6 |
| 8 | .1 | .6 | 1.2 | 2.4 | 1.3 | .3 | .5 | .7 | .9 | 1 | .3 | .6 | .7 | 1.2 | .5 |
| 9 | .1 | .5 | 1.1 | 2.3 | 1.2 | .3 | .4 | .5 | .7 | .7 | .5 | .5 | .6 | .7 | .3 |
| 10 | .1 | .4 | .9 | .8 | 1 | .2 | .3 | .4 | .6 | .5 | .6 | .6 | .7 | .6 | .3 |
| 11 | 0 | .3 | .6 | .7 | .7 | .2 | .2 | .6 | .8 | .4 | .9 | .9 | .8 | .7 | .3 |
| 12 | 0 | .2 | .4 | .5 | .6 | .3 | .3 | 1 | 3 | 5 | 1.3 | 1.2 | 1.2 | .7 | .3 |
| 13 | 0 | .2 | .2 | .3 | .4 | .3 | .4 | 4.1 | 4.8 | .7 | 1.4 | 6.3 | 1.3 | .8 | .4 |
| 14 | 0 | .1 | .1 | .1 | .2 | .2 | .4 | 4.6 | 5 | .7 | 1.3 | 6.6 | 1.7 | .7 | .3 |
| 15 | 0 | 0 | 0 | .1 | .1 | .1 | .2 | 1.8 | 2 | .5 | .6 | 1.2 | .7 | .4 | .2 |
| 16 | 0 | 0 | 0 | 0 | 0 | 0 | .1 | .7 | .8 | .2 | .3 | .4 | .3 | .2 | .1 |

FIG. 3

TRANSISTOR OPEN

X COORDINATES

| Y | A | B | C | D | E | F | G | H | I | J | K | L | M | N | O |
|---|---|---|---|---|---|---|---|---|---|---|---|---|---|---|---|
| 1 | 0 | 0 | 0 | 0 | 0 | 0 | 0 | 0 | 0 | 0 | 0 | 0 | .1 | .3 | .1 |
| 2 | 0 | 0 | 0 | 0 | 0 | 0 | 0 | 0 | 0 | 0 | 0 | 0 | .2 | .5 | .2 |
| 3 | 0 | 0 | 0 | .1 | 0 | 0 | 0 | 0 | 0 | 0 | 0 | .1 | .4 | .6 | .3 |
| 4 | .1 | .2 | .3 | .3 | .1 | 0 | 0 | 0 | 0 | 0 | 0 | .2 | .6 | .9 | .4 |
| 5 | .1 | .3 | .5 | .9 | .5 | .3 | .1 | 0 | 0 | 0 | 0 | .4 | .7 | 1. | .5 |
| 6 | .1 | .4 | .7 | 1.8 | .8 | .4 | .1 | 0 | 0 | 0 | .1 | .6 | .8 | 1.3 | .6 |
| 7 | .1 | .5 | .9 | 2.3 | 1 | .5 | .2 | 0 | 0 | 0 | .1 | .6 | .8 | 1.3 | .6 |
| 8 | .1 | .6 | 1.2 | 2.4 | 1.3 | .8 | .2 | .1 | .4 | .2 | .1 | .6 | .7 | 1.2 | .5 |
| 9 | .1 | .5 | 1.1 | 2.3 | 1.2 | .7 | .4 | .5 | .7 | .4 | .1 | .5 | .7 | .6 | .3 |
| 10 | .1 | .4 | .9 | .8 | 1 | .5 | .3 | .4 | .6 | .3 | 0 | .5 | .7 | .6 | .3 |
| 11 | 0 | .3 | .6 | .5 | .5 | .2 | .2 | .6 | 8 | 2 | .6 | .4 | .7 | .7 | .3 |
| 12 | 0 | .2 | .4 | .4 | .4 | .3 | .3 | .1 | 3 | 1 | .5 | .2 | .1 | 0 | 0 |
| 13 | 0 | .2 | .2 | .3 | .3 | .3 | .4 | 4.1 | 4.8 | .7 | .2 | .1 | 0 | 0 | 0 |
| 14 | 0 | .1 | .1 | .1 | .2 | .2 | .4 | 4.6 | 5 | .7 | .2 | 0 | 0 | 0 | 0 |
| 15 | 0 | 0 | 0 | 0 | 0 | .1 | .2 | 1.8 | 2 | .5 | .1 | 0 | 0 | 0 | 0 |
| 16 | 0 | 0 | 0 | 0 | 0 | 0 | .1 | .7 | .8 | .2 | .1 | 0 | 0 | 0 | 0 |

Y COORDINATES

FIG. 4

NORMAL

|  | A | B | C | D | E | F | G | H | I | J | K | L | M | N | O |
|---|---|---|---|---|---|---|---|---|---|---|---|---|---|---|---|
| $\Delta A_1$ | .1 | .2 | .4 | .5 | .3 | .2 | .3 | .5 | .5 | .4 | .3 | .3 | .7 | .7 | .4 |
| $\Delta B_1$ | .1 | .2 | .2 | -.1 | -.1 | 0 | .1 | .1 | .1 | 0 | .1 | .1 | -.1 | .1 | 0 |
| $\Delta A_2$ | 0 | .4 | .9 | 2 | 1 | 0 | .2 | 1 | .1 | .2 | -.1 | .2 | 0 | .2 | 0 |
| $\Delta B_2$ | 0 | 0 | -.1 | -.8 | 0 | -.2 | -.4 | -3.8 | -4.3 | -1.4 | -.5 | -.2 | -.2 | -.4 | -.2 |
| $\Delta A_3$ | -.2 | -.4 | -1 | -1.9 | -.9 | 0 | -.2 | ..7 | 1.5 | 4.2 | 1.1 | 1 | .7 | .1 | 0 |
| $\Delta B_3$ | 0 | 0 | 0 | 1.3 | .1 | .2 | .2 | .5 | 2.3 | 4.8 | .3 | .2 | .3 | .1 | 0 |
| $\Delta A_4$ | 0 | -.3 | -.3 | -.3 | -.5 | -.4 | -.5 | -6.2 | -7 | -.7 | -1.8 | -11.3 | -2 | -.9 | -.4 |
| $\Delta B_4$ | 0 | .1 | .1 | .1 | .1 | 0 | -.1 | -1.6 | -1.4 | -.3 | -.2 | -1.1 | -.8 | -.1 | 0 |

FIG. 5

TRANSISTOR OPEN

| | A | B | C | D | E | F | G | H | I | J | K | L | M | N | O |
|---|---|---|---|---|---|---|---|---|---|---|---|---|---|---|---|
| $\Delta A_1$ | .1 | .2 | .3 | .4 | .1 | 0 | 0 | 0 | 0 | 0 | 0 | .3 | .7 | .7 | .4 |
| $\Delta B_1$ | .1 | .2 | .3 | .2 | .1 | 0 | 0 | 0 | 0 | 0 | 0 | .1 | .1 | .1 | 0 |
| $\Delta A_2$ | 0 | .4 | .9 | 2 | 1 | .6 | .2 | .1 | .4 | .2 | .1 | .2 | 0 | .2 | 0 |
| $\Delta B_2$ | 0 | 0 | .1 | -.8 | 0 | .2 | 0 | .1 | .4 | .2 | -.1 | -.2 | -.2 | -.4 | -.2 |
| $\Delta A_3$ | -.2 | -.4 | -1 | -2.2 | -1.3 | -.7 | -.2 | -.2 | 9.7 | 2.3 | 1 | -.4 | -.6 | -.5 | -.3 |
| $\Delta B_3$ | 0 | 0 | 0 | 1.4 | .1 | .3 | .2 | -.4 | -4.9 | -.9 | 0 | -.2 | -.6 | -.7 | -.3 |
| $\Delta A_4$ | 0 | -.3 | -.3 | -.4 | -.5 | -.4 | -.5 | -6.2 | -7 | -.7 | -.2 | -.1 | 0 | 0 | 0 |
| $\Delta B_4$ | 0 | .1 | .1 | .2 | .1 | 0 | -.1 | -1.6 | -1.4 | -.3 | 0 | .1 | 0 | 0 | 0 |

FIG. 6

Aug. 26, 1969   R. W. JONES ET AL   3,463,007
FIELD GRADIENT CORRELATOR SYSTEM FOR FIELD EFFECT TESTING
Filed Feb. 27, 1967   8 Sheets-Sheet 8

INVENTORS
ROGER W. JONES
LLOYD M. WHITE
BY
*Robert G Rogers*
ATTORNEY

United States Patent Office 3,463,007
Patented Aug. 26, 1969

3,463,007
FIELD GRADIENT CORRELATOR SYSTEM FOR FIELD EFFECT TESTING
Roger W. Jones, Garden Grove, and Lloyd M. White, Fullerton, Calif., assignors to North American Rockwell Corporation, a corporation of Delaware
Filed Feb. 27, 1967, Ser. No. 618,911
Int. Cl. G01k 11/00, 7/00
U.S. Cl. 73—355                                 3 Claims

ABSTRACT OF THE DISCLOSURE

A system for detecting and recording the differential change in the thermal radiation pattern of an electronic unit under test by comparing the recorded differential change with similar data taken from a reference unit for determining whether or not the temperature of the components of the test unit is within proper limits. The change in the radiation pattern is computed and used in the comparison, rather than the absolute intensity. An X and Y positioning apparatus controlled by a computer is used to position the field effect detector during the test.

Background of the invention

*Field of the invention.*—The invention relates to a system for measuring changes in an electromagnetic radiation generated by an electronic unit and for comparing the differential changes in the radiation with similar differential changes derived from a reference unit for correlating radiation patterns without errors caused by background radiation and detector variations, etc.

*Description of prior art.*—Infrared radiation testing techniques as a means for rapid and non-destructive testing of electronic units has become increasingly more important since it was first begun in 1962. Various systems and processes have been developed for measuring infrared radiation to detect overstressed or non-uniform components. As a result, the reliability of circuitry particularly in the avionics field has improved.

The concept is based on the fact that the intensity of the infrared radiation emitted by a component indicates its temperature. Since temperature affects the longevity of the component, by correlating the radiation with temperature, a malfunctioning component can be determined. One description of the use of infrared testing is described in the May 4, 1964 issue of Aviation Week and Space Technology, pages 82 through 89.

Thermal detectors and photo detectors are the two major infrared detectors in use at the present time. A thermal detector depends on temperature changes produced by the incoming radiation to change the electrical or physical properties of the detector. The thermal detector responds to all wavelengths on the infrared spectrum. Since the thermal detector depends on heating to produce an output, the response time of the detector is related to the heat capacitor and the thermal resistance of its detector.

Photo detectors respond to the incoming radiation by generating electron-hole pairs in semiconductor materials. Photo detectors can use the photo voltaic, PV, photoconductive, PC, photoelectromagnetic phenomena in the infrared spectrum. Of the photo detectors, the photo voltaic detector is the most sensitive. It can be made to respond to only the fraction of radiation of interest in testing a unit.

Ordinarily, however, the problem is not in the type of detector used or the amount of test data available for comparing a test system with a reference system but is instead the background radiation emitted by the test fixture, and other parts of the electronic circuit under test. In addition, the detector itself may be supplying background radiation which yields an incorrect field level.

A system is desired wherein the electromagnetic radiation is tested on a differential basis so that background radiation is eliminated. In other words, by testing the change in radiation between points of a radiation pattern, an accurate determination of whether or not a component is overheating can be made. The magnitude may change due to background radiation, but the slope of the curve forming the pattern remains relatively fixed. In addition, to accurately detect changes in radiation, a preferred system should include a means for correlating the detected field pattern with a reference pattern for accurately determining when a malfunction occurs.

As indicated in the referenced article, most of the present art test systems detect the magnitude of the electromagnetic field pattern by examining the field levels and field energy levels as specific points. No means are provided for accurately detecting changes in field patterns and for correlating the changes in the field patterns with recorded changes in reference patterns for effectively locating disturbances from malfunctioning elements.

Summary of the invention

Briefly, the invention comprises means for detecting change in the electromagnetic radiation emitted by an electronic circuit board under various operating conditions. In addition, means are provided for positioning the detector so that measurements are taken between selected sets of X and Y coordinates points of the pattern. The system includes means for calculating the difference in the radiation levels between the points and for comparing the difference with reference test data taken between similar points of a reference circuit board. In other words, the slopes of curves forming the radiation pattern are calculated.

The system also includes means for generating an error signal output if the difference between the test and reference data is greater than a predetermined value, which is related to the system under test.

In a preferred embodiment, an X and Y positioner is connected either to the detector or the electronic unit under test so that the detector and test unit are moved relative to each other in a definite and repeating pattern. A pulse synchronizer is connected to the positioner for providing energy stimulus for moving the detector and unit relative to each other in accordance with a time reference. After the data has been measured and the difference stored, the reference data can be subtracted from the test data, or vice versa.

As indicated, if the compared signals are different, an output signal is generated which is referenced to a particular X and Y coordinate of the test data so that the malfunctioning component can be readily located.

Therefore, it is an object of this invention to provide an improved system and process for meausring differential changes in infrared radiation patterns for detecting overstressed or non-uniform components.

It is still a further object of this invention to provide an improved infrared radiation system for non-destructive testing of electronic units including means for correlating the test data with reference data.

Still another object of this invention is to provide a means for measuring the differential radiation of an electronic test unit for eliminating background radiation.

A still further object of this invention is to measure changes in electromagnetic fields and for correlating the measured changes with referenced data for accurately locating malfunctioning test components.

These and other objects of this invention will become more apparent in connection with the following drawings.

Brief description of drawings

FIGURE 3 illustrates an exemplary set of test data for a normal circuit board.

FIGURE 4 illustrates an exemplary set of test data for an abnormal circuit board.

FIGURE 5 represents one set of calculated data for a normal board.

FIGURE 6 represents one set of calculated data for an abnormal circuit board.

Description of the preferred embodiments

Figure 1:
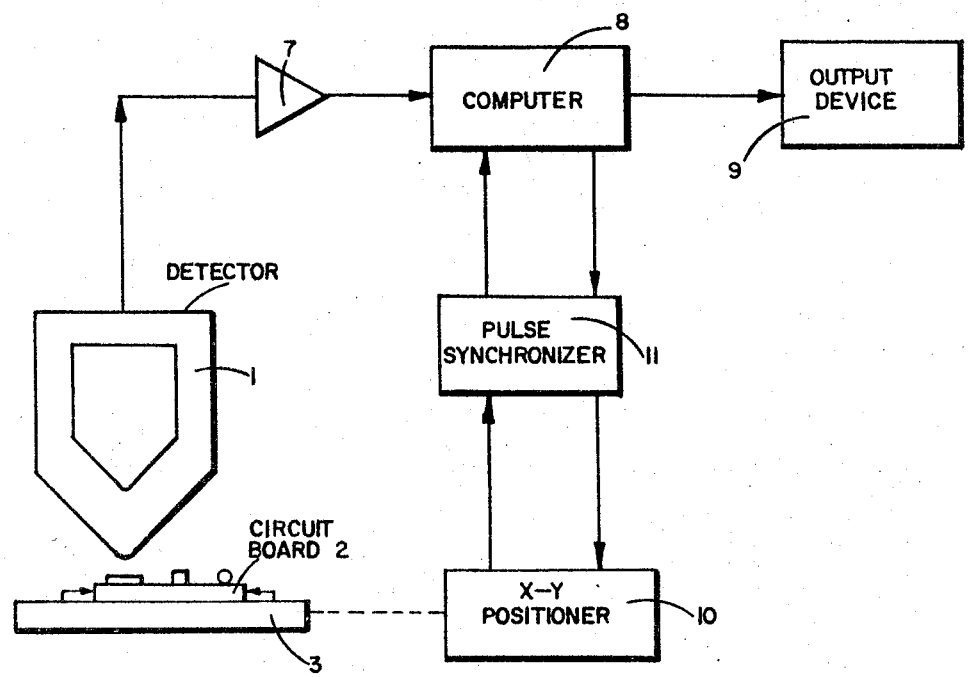
FIGURE 1 illustrates one embodiment of a system for field effect testing of an electronic circuit board.

FIGURE 1 shows field detector 1 for measuring the radiation emitted by electronic circuit board 2 secured to loading fixture 3. One detector, or radiometer, which may be used in the system is an indium antimonide, liquid nitrogen cooled, infrared detector which is commercially available. The detector may be mounted on a tripod positioned over the loading fixture, and focused on a spot that can be traversed by the circuit board in a test cycle.

The circuit board may comprise resistors, capacitors, transistors, etc. During the test, power levels are applied to the circuit so that the components undergo a temperature increase in response to the applied power. The temperature increase causes electromagnetic radiation which is related to the thermal resistance and emissivity of the electronic components.

Amplifier 7 is connected to receive test signals from the detector. The signals are amplified to a desired level. The amplifier is connected to data processor 8 which may comprise a digital computer such as that described in Patent No. 3,237,168 by T. M. Hertz for a Computer.

Output means 9, such as a typewriter, is connected to the computer. Other outputs may also be made available from the computer during and after the scanning cycle. For example, a continuous display of the temperature profile of a particular circuit board along the scan trajectory may be provided by means of an oscilloscope display. Each of the data points stored in a computer memory may be picked up and decoded for the oscilloscope display.

Positioner 10 such as an X–Y positioner, is connected to fixture 3 for moving the circuit board in an X and Y direction relative to the detector. The positioner is actuated by signals from pulse synchronizer 11. The synchronizer is shown as a separate circuit in FIGURE 1 connected to the positioner and the computer. Signals from the computer regulate the rate and duration of pulses from the synchronizer.

In other embodiments, the synchronizing pulses could be derived from the computer. The synchronizer causes the circuit board to move in a pattern defined by magnitude and spacing of the pulses, so that the X and Y coordinates of the pattern developed can be correlated with a similar reference pattern stored in the computer. In other words, at $t_1$ time the detector may be coordinate $X_0$, $Y_0$, and at $t_2$ time, the detector may be at $X_1$, $Y_0$ etc. Since the synchronizing pulses are controlled by the computer, data measured by the detector at each set of coordinates can be correlated with the stored data at the corresponding coordinate positions. A set of data taken from points of a circuit board defined by coordinates may be described as a cell.

In a workable embodiment, the computer comprises storage areas such as recording channels of a disc or drum memory, or magnetic core matrix. The computer should also include arithmetic registers for adding and subtracting binary information received from memory or from an input device connected to the computer. Details on the component parts of the computer can be found in the referenced application although it is believed that such details would be obvious to persons skilled in the art. For those reasons, specific details as to circuitry, etc. are not included herein.

Several methods of obtaining and storing sets of reference values may be visualized. In one process a device which is known to be properly functioning is placed into the system and a complete scan process is conducted. The values for each cell in a reference array are stored by a computer. Another method is to calculate the reference values for each point in the array by statistical analysis of a number of known to be functioning devices or by theoretical prediction based on the design of parameters of the device with subsequent manual insertion of the values into the reference array.

Prior to starting the test of an electronic unit, the reference data for a correctly functioning module is loaded into storage locations within the computer. The information may be loaded from an external storage media such as perforated paper tape or magnetic tape. Reference data must be provided for each circuit board being tested.

Figure 2:
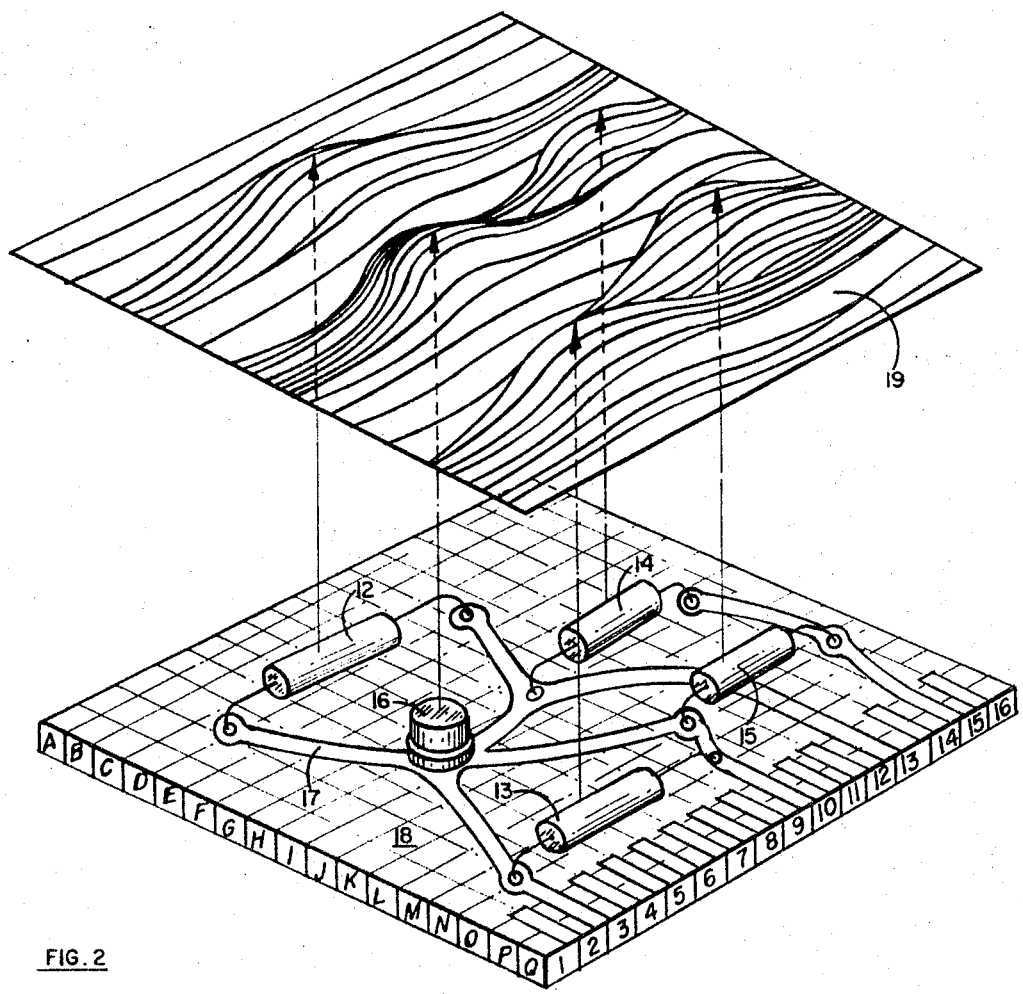
FIGURE 2 illustrates one embodiment of a circuit board with a normal radiation pattern emitted by the board.

FIGURE 2 shows circuit board 2 comprising resistors 12, 13, 14 and 15 and transistor 16. The various components are interconnected by conductors 17 on circuit board substrate 18. The board is shown divided into coordinates A through Q and 1 through 16. The radiation pattern 19 disposed over the board illustrates the normal radiation patern. When power is applied to the board, radiation emitted by the components forms the hills and valleys of the pattern.

Figure 2A:
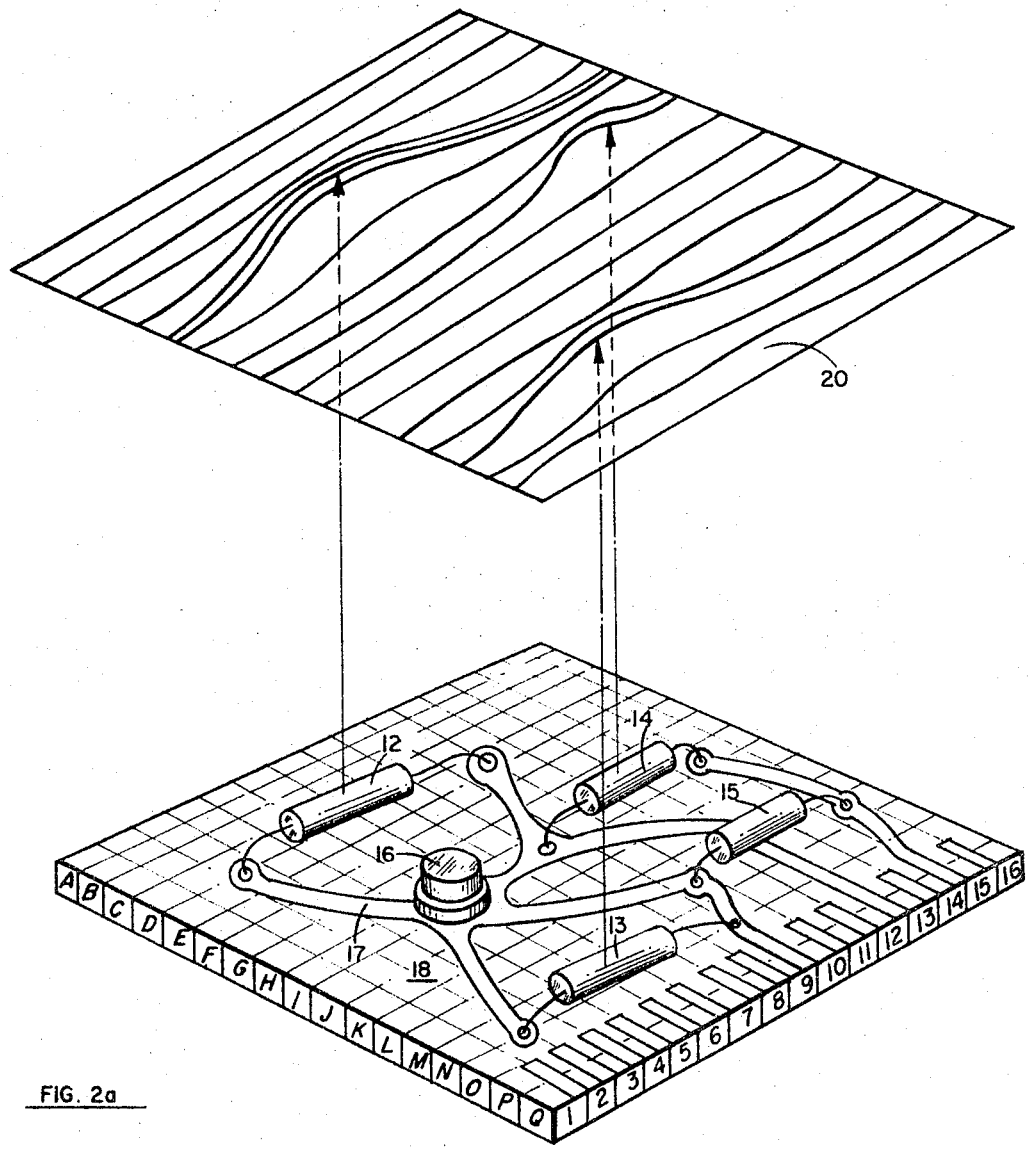
FIGURE 2a illustrates one embodiment of a circuit board with an abnormal radiation pattern emitted by the board.

FIGURE 2a shows the circuit board with radiation pattern 20 disposed over the circuit board. The radiation pattern exemplifies the radiation from the circuit with an open transistor. FIGURE 4 illustrates an exemplary set of test data taken for an abnormal circuit board having pattern 20.

In operation, the board to be tested is placed into the loading fixture connected to the X and Y positioners. A source of excitation is connected to the board to properly energize the circuits being tested. Servo loops comprising a part of the positioner are opened and the spot position of the radiometer (detector) is brought into coincidence with the starting point of the scan trajectory. The servo loops are closed and the computer control scan process is initiated by turning the compute switch on. When the compute switch is turned on, the pulse synchronizer is also turned on. The scanning process continues automatically until the entire board has been scanned. In other words, after each comparison has been made in the computer, the synchronizer generates another pulse to cause the positioner to assume a new position.

In general, the scan trajectory starts from coordinate $A_1$ and proceeds to coordinates $A_2$, $A_3$ . . . $A_{16}$ in an X direction. The amplitude of the radiation is detected at each point and stored in locations within the computer. After completing an X direction scan, the scan is moved in the Y direction until the last column 0 has been scanned. In other words, as shown in FIGURE 3, for a normal board, test data at coordinate $I_1$ is equal to one-tenth, whereas for an abnormal board as shown in FIGURE 4, at $I_1$ the test data is zero. The zero is due to the fact that the FIGURE 4 test data was taken from a board having an open transistor.

After completing the scan of one or more lines, or as soon as previously detected data values are taken from storage and placed into arithmetic registers inside the computer, the following equation is solved from each set of coordinates, $$\Delta A = (A_{i+2} + A_{i+3}) - (A_i + A_{i+1})$$
$$\Delta B = (A_i + A_{i+3}) - (A_{i+1} + A_{i+2})$$

The resulting set of values for $\Delta A$ and $\Delta B$ of each radiation unit of the array is then stored.

FIGURE 5 illustrates a set of $\Delta$ values calculated from the data illustrated in FIGURE 3. FIGURE 6 illustrates a calculated set of $\Delta$ values taken from the data illustrated in FIGURE 5.

After computing the $\Delta$ values indicating the slopes of each unit of the radiation pattern emitted by the test board, a comparison is made between corresponding values of the reference array and the test array. The comparison is made according to the following equation, $$|\Delta R - \Delta| > K_1 |\Delta R| + K_2$$

Where $\Delta R$ is the reference value of $\Delta a$ or $\Delta b$ for a selected unit of radiation, $\Delta V$ is the "unknown" value of $\Delta a$ or $\Delta b$ for the corresponding selected unit of radiation, and $K_1$ and $K_2$ are empirically determined constants.

A malfunction is indicated whenever the left side of the equation is larger than the right side. $K_1$ is chosen small enough to provide a high probability of rejecting malfunctioning devices, yet large enough to accept a high percentage of correctly operating devices. $K_2$ is chosen large enough to mask the inherent noise level of the detector.

Specific examples of calculations performed by the computer in determining $\Delta A$ and $\Delta B$ for abnormal boards is shown as follows:

NORMAL BOARD

Coordinates H (5 through 8)

$$\Delta A_2 = (3.1 + .7) - (0.7 + 2.1) = 1$$
$$\Delta B_2 = (0.7 + 0.7) - (2.1 + 3.1) = -3.8$$

ABNORMAL BOARD

Coordinates H (5 through 8)

$$\Delta A_2 = (0 + 0) - (0 + .1) = -.1$$
$$\Delta B_2 = (0 + .1) - (0 + 0) = .1$$

Assuming a value for the constants $K_1$ and $K_2$ as .08, it can be seen that a malfunction exists because the left side value is larger than the right side value.

$$|\Delta A_{2A} - \Delta A_{2N}| = |1 + .1| > (.08)|(1) + .08| = |1.1| > 0.16$$

where $\Delta A_{2N}$ is the calculated value for an abnormal board, and $\Delta A_{2A}$ is the calculated value for a normal board.

As indicated by a comparison of the calculated values for the coordinates involved, the normal board has an increasing slope while the abnormal board has almost no slope at all. The difference is due to the fact that the transistor is open for the calculations shown in FIGURE 4. Similar calculations can be made for all points on the board as shown in FIGURE 5 and 6.

The $\Delta A$ values calculated in accordance with the above equations, represent the slopes, or tilts, between the extremities of the coordinates involved. The $\Delta B$ values represent convolutions within the extremities of the coordinates involved. A concentration of the $\Delta A$'s and $\Delta B$'s describe the slope of a line along the X and Y axis of a radiation pattern.

The $\Delta A$ and $\Delta B$ values may also be calculated using a different equation so that the values derived from the coordinates, or cells, have both X and Y dimensions. A cell consists of measurements made at the $A_i$, $B_i$, $B_{i+1}$ and $A_{i+1}$ coordinates. The scan from the A to B column represents a Y direction scan. The scan down the A and B columns represents X direction scans. The following equation is used in determining the values, $$\Delta A = (B_{i+1} + A_{i+1}) - (A_i + B_i)$$
$$\Delta B = (B_i + B_{i+1}) - (A_i + A_{i+1})$$

The $\Delta A$ value is calculated by the above equation and actually represents the slope of the cell in the X direction and the $\Delta B$ value represents the slope of the cell in the Y direction. Three dimensional surface slopes can be represented in this manner.

Converting the measured values of the electromagnetic field to $\Delta$ values reduces the data required to represent any surface shape. In many applications it is desirable to reduce the encoded data to a minimum retaining only certain pertinent information. Testing electronic circuits by sensing the infrared radiation is one such application. An electronic circuit has many states. One state is the desired state. The circuit is in the desired state when all parts in the circuit are working in concert to perform the function for which the circuit was designed to perform. Other states exist when one or more parts of the circuit fail and prevent the circuit from functioning as intended.

If it is desired to test a circuit, it is necessary to know some features or characteristics of the circuit that uniquely describe its state. If it is desired only to know whether the circuit is functioning as intended, or is in the desired state, only the characteristics of the desired state need be known. The characteristics of the desired state are the test criteria. The circuit is tested by measuring the pertinent characteristics of the circuit and comparing them with the test criteria. If there is full agreement, the circuit is in the desired state. If it is desired to determine the state of the circuit when it is not in the desired state, the criteria for each possible state must be known such that the set of measured characteristics can be compared with the criteria for each state until the state of the circuit or failure is identified.

Since there are a large number of failure states, it is desirable to reduce the data required to describe each state to a minimum.

The data required to describe the radiation pattern of the circuit may be converted into symbols representing three levels, for example, +, −, and 0. When the three symbols representing the $\Delta$ values are processed, the locations of hills, pits, valleys, ridges, and saddles forming a radiation pattern can be determined. The position and number of hills, pits, valleys, etc. uniquely describes the state of the circuit. Only the symbols describing the location of the described features need be retained. Other data can be discarded. In other words, when the $\Delta$ values are calculated, the +, − and 0 values may be converted into symbols and the original data used in the calculation can be discarded.

The hills, pits, ridges and valleys occur at the junction of a cell having $\Delta$ values of opposite polarity. For example, let an → represent the ascending direction of a $\Delta$ value, with $\Delta A$ in the X direction and $\Delta B$ in the Y direction. Combining the symbols adopted, the following representations are possible,

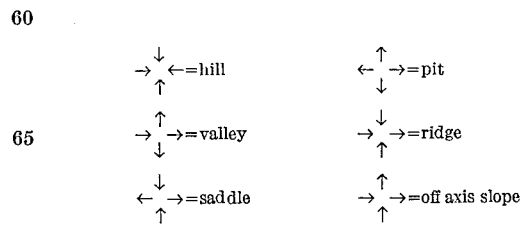

For a calculated set of data having a value of 0, the symbol would be 0. Zeros represent flat areas in the measured profile. It may represent a broadened area of pits, hills, valleys or ridges. It may also occur at the edges of the profile. In the latter case it is meaningless.

It can be shown that 16 combinations of symbols can be derived from data taken from the radiation pattern and that the combinations can be used to provide a precise description of the surface features without regard for the magnitude of the overall radiation field. It does, however, portray the relative magnitudes of the elements of the field. Data can be taken for comparison with a reference in different environment with detectors having different gains without affecting the results.

For many applications, only the most prominent features of the field need be retained. The location of the symbols representing saddles, valleys, ridges and off axis slopes may be disregarded. As a result, the symbols can be reduced from 16 combinations to 6. If further simplification is desired, additional cell junctions can be disregarded.

Figure 7:
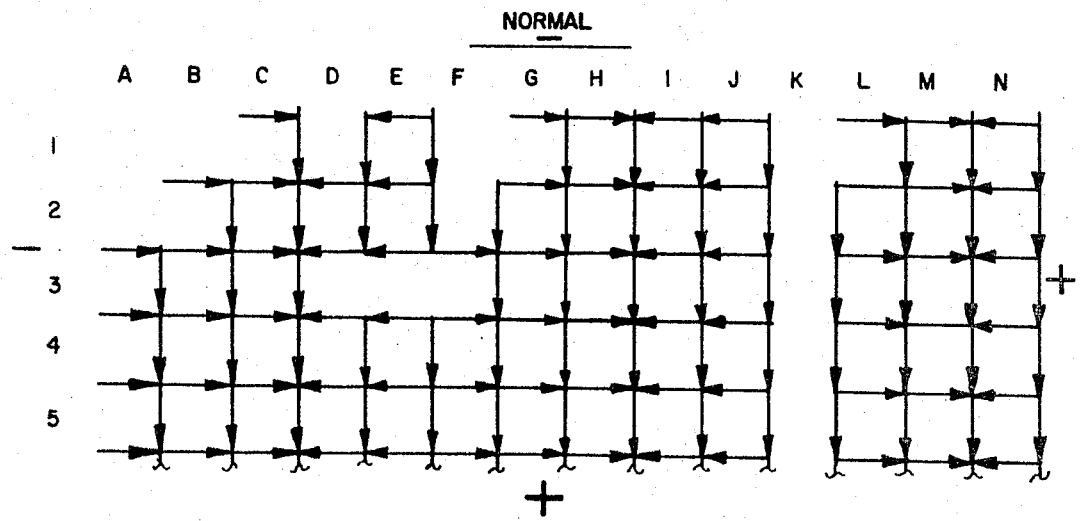
FIGURE 7 illustrates a test pattern for a normal board.

A specific example of a portion of a pattern taken from a normal board is shown in FIGURE 7. As indicated therein, at the data cell at coordinate $H_1$ through $H_5$ a ridge occurs terminating at a hill at $H_6$. A valley occurs at coordinate $E_4$ and $E_5$. Hills occur at $C_7$, $H_6$, $H_{13}$, $K_{13}$ and $M_{5-6}$. Pits occur at $I_9$ and $I_{12}$. The radiation pattern shown in FIGURE 7 does not illustrate all the examples given although the pattern can be completed to show the examples by additional analysis of the FIGURE 3 data. The pattern was shortened as a matter of convenience.

Figure 8:
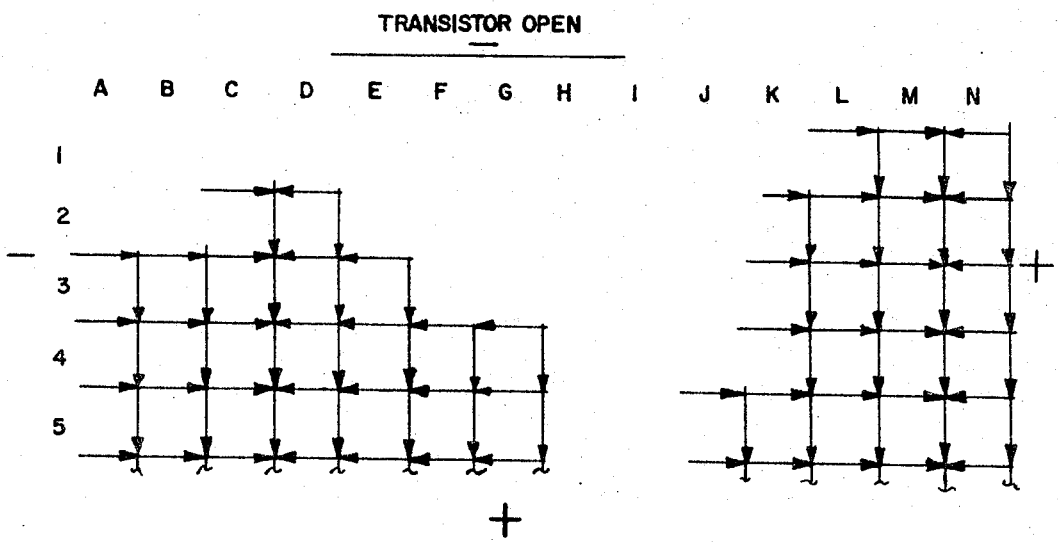
FIGURE 8 illustrates a test pattern for an abnormal board.

In FIGURE 8 for a radiation pattern of the same circuit but having an open transistor failure the above specific examples change as follows. The ridge at $H_1$ through $H_5$ is absent. The valley at $E_4$ through $E_6$ changed to an off axis slope. The hill $E_6$ moved to $I_8$; the hill $K_{13}$ moved to $H_{10}$. The pits are at $I_{11}$ and $J_9$ instead of $I_9$ and $I_{12}$. The blank spaces represent zeros. Zeros could have been added although the blank space provides as much of an indication. The radiation pattern shown in FIGURE 8 does not illustrate all the examples given although the pattern can be completed to show the examples by additional analysis of the FIGURE 4 data. The pattern was shortened as a matter of convenience.

The data shown in FIGURES 3 and 4 could have been converted to a symbolized form as shown in FIGURES 7 and 8 so that by scanning the form for significant features, such as hills and valleys, an indication could quickly have been made as to whether a board was performing normally or abnormally.

Although the invention has been described and illustrated in detail, it is to be understood that the same is by way of illustration and example only, and is not to be taken by way of limitation.

We claim:
1. A field gradient correlator system for field effect testing of electronic units emitting thermal radiation comprising,
means for measuring the intensity of the thermal radiation from an electronic unit at a first set of X and Y coordinate points, and
for measuring the intensity of the thermal radiation from said electronic unit at a second set of X and Y coordinate points adjacent to said first set of coordinate points means for computing the difference between the measured intensities at said adjacent points for determining the change in the intensity of the thermal radiation between said points,
means for comparing the computed difference with a difference of thermal radiation intensities of a referenced pattern of thermal radiation for the sets of coordinate points involved, including means for indicating if the computed difference is within the limits prescribed by the reference difference.

2. The combination as recited in claim 1 wherein the means for computing comprises means for calculating the magnitudes of intensities of said thermal radiation at the four adjacent sets of said coordinate points, including means for calculating the magnitudes of the intensities of the thermal radiation at the coordinates of the second intermediate sets of coordinate points for determining whether or not the radiation pattern defined by said adjacent coordinate points includes a convolution between the two extreme coordinate points, as well as determining the direction of the change in the radiation pattern from one of said extreme coordinate points to the other.

3. The combination as recited in claim 1, wherein the change in the intensity of the thermal radiation pattern measured at four adjacent coordinate points which form the corners of a square is calculated in accordance with the following equation, $$\Delta A = (B_{i+1} + A_{i+1}) - (A_i + B_i)$$

and $$\Delta B = (B_i + B_{i+1}) - (A_i + A_{i+1})$$

where A and B are the measured radiation intensities at the adjacent coordinate points and where the $\Delta A$ values represent the change in the intensity of the thermal radiation pattern measured at the adjacent coordinate points in the X direction, and the $\Delta B$ values represent the change in the intensity of the thermal radiation pattern measured at the adjacent coordinate points in the Y direction.

References Cited

UNITED STATES PATENTS

| | | | |
|---|---|---|---|
| 3,219,927 | 11/1965 | Topp et al. | 324—73 |
| 3,350,702 | 10/1967 | Herman | 73—355 XR |

OTHER REFERENCES

Herman, R. A.: Infra-Red for Circuit Check-out in Electrical Engineering, vol. 82, No. 1, January 1963, pp. 21-25.

Klass, P. J.: Use of Infra-Red Technique Growing. In Aviation Week and Space Technology, vol. 80, No. 8, May 4, 1964, pp. 82-89.

LOUIS R. PRINCE, Primary Examiner

FREDERICK SHOON, Assistant Examiner

U.S. Cl. X.R.

73—343; 324—73; 340—149, 227

PO-1050
(5/69)

UNITED STATES PATENT OFFICE
CERTIFICATE OF CORRECTION

Patent No. 3,463,007          Dated August 26, 1969

Inventor(s) R. W. Jones et al

It is certified that error appears in the above-identified patent and that said Letters Patent are hereby corrected as shown below:

Column 6, lines 3 and 4, the formula reading $$\Delta A = (B_{i+1} + A_{i-1}) - (A_i + B_i)$$
$$\Delta B = (B_i + B_{i+1}) - (A_i + A_{i-1})$$

should read $$\Delta A = (B_{i+1} + A_{i+1}) - (A_i + B_i)$$
$$\Delta B = (B_i + B_{i+1}) - (A_i + A_{i+1})$$

Column 8, line 29, the formula reading $$\Delta A = (B_{i+1} + A_{i-1}) - A_i + B_i)$$

should read $$\Delta A = (B_{i+1} + A_{i+1}) - (A_i + B_i);$$

line 32, the formula reading $$\Delta B = (B_i + B_{i+1}) - (A_i + A_{i-1})$$

should read $$\Delta B = (B_i + B_{i+1}) - (A_i + A_{i+1}).$$

SIGNED AND
SEALED
JUN 23 1970

(SEAL)
Attest:

Edward M. Fletcher, Jr.
Attesting Officer

WILLIAM E. SCHUYLER, JR.
Commissioner of Patents